US006491157B1

(12) United States Patent
Kölling et al.

(10) Patent No.: US 6,491,157 B1
(45) Date of Patent: Dec. 10, 2002

(54) TOOTHED BELTS FOR TRANSPORTING OBJECTS

(75) Inventors: Rudi Kölling, Vlotho (DE); Friedrich Sundermeier, Bad Oeynhausen (DE)

(73) Assignee: Breco Antriebstechnik Breher GmbH & Co. (DE)

( * ) Notice: Subject to any disclaimer, the term of this patent is extended or adjusted under 35 U.S.C. 154(b) by 117 days.

(21) Appl. No.: 09/680,855

(22) Filed: Oct. 6, 2000

(30) Foreign Application Priority Data

Oct. 14, 1999 (DE) .......................... 199 49 545

(51) Int. Cl.[7] .............................. B65G 47/84
(52) U.S. Cl. ...................... 198/867.11; 198/867.12; 198/803.14; 198/803.15; 198/867.01
(58) Field of Search ..................... 198/867.15, 867.14, 198/867.11, 867.12, 803.14, 803.15, 867.01

(56) References Cited

U.S. PATENT DOCUMENTS

| | | | | |
|---|---|---|---|---|
| 3,537,571 A | * | 11/1970 | Wiese ........................ | 198/193 |
| 3,538,997 A | * | 11/1970 | Christine ................... | 198/131 |
| 3,707,219 A | * | 12/1972 | Seragnoli ................... | 198/131 |
| 3,896,921 A | * | 7/1975 | Sund et al. ................ | 198/19 |
| 4,263,837 A | * | 4/1981 | Tassie ........................ | 89/34 |
| 4,418,815 A | * | 12/1983 | Anderson et al. ........... | 198/476 |
| 4,518,076 A | * | 5/1985 | Feisel et al. ................ | 198/648 |
| 4,574,461 A | * | 3/1986 | Repella ...................... | 29/564 |
| 4,715,193 A | * | 12/1987 | Curti ......................... | 62/345 |
| 4,763,443 A | * | 8/1988 | Williames ................... | 47/86 |
| 4,778,045 A | * | 10/1988 | Grune et al. ............... | 198/803.01 |
| 5,139,131 A | * | 8/1992 | Persson et al. ............. | 198/346.1 |
| 5,191,693 A | * | 3/1993 | Umetsu ...................... | 29/429 |
| 5,197,585 A | * | 3/1993 | Blood ........................ | 198/384 |
| 5,282,531 A | * | 2/1994 | Zysset ....................... | 198/803.14 |
| 5,287,957 A | * | 2/1994 | Iuchi et al. ................. | 198/803.14 |
| 5,339,939 A | * | 8/1994 | Gueble et al. ............... | 198/345.2 |
| 5,339,948 A | * | 8/1994 | Cox et al. ................... | 198/635 |
| 6,122,821 A | * | 9/2000 | Dornieden et al. .......... | 29/791 |

* cited by examiner

*Primary Examiner*—Joseph E. Valenza
*Assistant Examiner*—Rashmi Sharma
(74) *Attorney, Agent, or Firm*—Blakely Sokoloff Taylor & Zafman

(57) ABSTRACT

The toothed belt has a band-shaped belt body which carries integrally formed teeth on one side. At least one of the teeth is provided with two openings which extend from the crown surface of the associated tooth through the toothed belt to the other side of the belt body and accommodate a respective retaining element in the form of a sleeve. The sleeves serve to clamp object mountings against the surface of the toothed belt. They each have a head, which is constituted by two projecting wings which are diametrically opposed to one another. The sleeves have a sufficient screw-in length for fastening the object mountings. They are also secured against being pulled through the material of the toothed belt and are rotationally fixedly mounted. Finally, their ends projecting out of the surface serve as centering projections. The sleeves ensure that there is no weakening of the teeth.

16 Claims, 2 Drawing Sheets

TOOTHED BELTS FOR TRANSPORTING OBJECTS

FIELD OF THE INVENTION

The invention relates to a toothed belt for transporting objects including a band-shaped belt body, which carries teeth formed on one side, at least one of the teeth being provided with at least one opening, which extends from the crown surface of the associated tooth through the toothed belt to the other side of the belt body and in which a retaining element for an object holder to be fastened to the other side of the belt body is arranged.

DESCRIPTION OF THE PRIOR ART

Such toothed belts are commonly used in production lines in which they are used for transporting workpieces from one processing station to another. This can be effected in a continuous movement or in a reciprocating movement.

Toothed belts offer the advantage of very precise movement control and thus very precise positioning of the object holders at the loading and unloading stations. The object holders ensure that the workpieces are reliably transported and remain precisely aligned.

The object holders were previously clamped against the rear surface of the toothed belt using screws which were screwed into the retaining elements. The latter were nuts which were situated in the associated openings at the height of the teeth. The openings defined a step at the height of the tooth feet, on which the retaining elements rested. The openings then continued through the belt body with a reduced diameter.

It has been found that the transport precision of such toothed belts, which are known in practice, leaves something to be desired.

It is thus the object of the invention to provide a toothed belt with increased transport accuracy.

SUMMARY OF THE INVENTION

In order to solve this object the toothed belt referred to above is characterised in accordance with the invention in that the retaining element has an elongate body which extends through the tooth at least into the belt body, that the elongate body has a head in the form of at least one laterally projecting wing and that the wing engages in a broadened region of the opening which is formed in the crown surface of the tooth.

The invention is based on the recognition that in the previously known toothed transport belts loosening of the object mountings was due to the fact that the nuts disposed in the openings provided too short a screw-in length by reason of their small dimensions. This risk is eliminated by the retaining elements in accordance with the invention.

The elongate body of the retaining elements, which extends at least into the belt body, provides sufficient substance to ensure a reliable fastening of the object mounting. This applies regardless of the shape of the elongate body.

The elongate body of the retaining element is preferably constructed in the form of a sleeve. The sleeve provides a sufficient engagement length. This applies particularly when the opening extends through the entire retaining element in the form of a through-opening. The engagement length results from the sum of the height of the tooth and the length of the elongate body which extends into the belt body.

The sleeves are preferably provided with an internal screwthread over their entire length. This is particularly appropriate when the sleeves consist of metal. In an important further embodiment of the invention it is proposed that the retaining elements be made of plastics material, preferably of glass fibre-reinforced polyamide. Plastics material of sufficient strength and hardness is readily able to cope with the requirements placed on the retaining elements. Plastics material offers, above all, the advantage that damage of the toothed pulleys cooperating with the toothed belts is reliably prevented.

The toothed belt preferably also comprises plastics material, particularly polyurethane, whereby longitudinally extending reinforcing wire cables are inserted in the belt body at the junction with the teeth. Such a toothed belt has proved to be satisfactory as regards the precision of its movement control. Polyurethane is high temperature-resistant. The same applies to the retaining elements of glass fibre-reinforced polyamide.

Sleeves of plastic material offer the further advantage that an internal screwthread can be omitted. The screwthread is pressed into the sleeve by the self-tapping screw, when it is screwed in. Furthermore, retaining elements of plastics material are lighter than metal sleeves.

The precision of the positioning of the workpieces, both at the loading station and at the unloading station, is determined by the precise arrangement of the openings in the toothed belt and the precise fastening of the object mountings with respect to these openings. In order to promote the latter aspect, it is proposed in a further embodiment of the invention that the elongate body of the retaining element engages through the belt body and projects out of its other side. The elongate body thus constitutes a centering projection on the rear surface of the belt which makes optimal positioning and alignment of the object mountings possible and, when the object mountings are secured by adhesive, can also serve as a jointing aid to reduce the mounting times.

The openings in the toothed belt can be produced subsequent to its manufacture. Optimal accuracy is obtained when the production of the openings is integrated into the moulding process of the toothed belt. The moulding process also ensures the desired spacing accuracy. The moulding process also offers the possibility of cutting a plurality of toothed belts of the desired breadth from an appropriate moulded article.

If the elongate body of the retaining element is of sleeve-shaped construction, its end projecting out of the other side of the belt body constitutes the centering projection which is of annular construction and permits the screwing in of a screw. It is proposed in a further embodiment of the invention that fastening or locking means be provided at this end of the elongate body. A sleeve-shaped construction is possible but not absolutely necessary. Also possible, for instance, is a threaded peg for the screwing on of a nut. The retaining element can also be provided with an elastic locking mechanism for engaging in the object mounting, for instance in the form of a head which is split or constructed to be elastic in some other manner.

The wing of the retaining element ensures that when the object mountings are tightened the mounting element cannot be drawn into the material of the toothed belt. This also increases the fastening security of the object mountings. This effect may be readily intensified if the head of the retaining element is constituted by two projecting wings which are diametrically opposed to one another. The wings extend on both sides of the elongate body in the longitudinal direction of the associated tooth and thus offer a large, force-balanced reaction surface, whereby they simultaneously ensure the rotational security of the retaining element. The wings preferably extend over the region of wire reinforcing cables which are embedded in the belt body.

The arrangement is such that the elongate body and its head are situated within the contour of the tooth and thus cannot impair the mode of operation of the tooth. In general, the outer diameter of the elongate body, which defines the breadth of the head, will be so selected that it corresponds exactly to the breadth of the crown of the tooth. It is then particularly advantageous to construct the wings of substantially triangular shape so that they fit harmoniously into the outline of the crown of the tooth. Rectangular wings are, however, equally possible, particularly if the elongate body has a relatively small outer diameter.

It is proposed in an important further embodiment of the invention that the head of the elongate body is fitted into the broadened region of the opening. The retaining element thus terminates with the plane of the crown surface of the tooth, whereby its wings adjoin the wall of the opening with practically no gap. The large advantage of this construction resides in the fact that the retaining element, which is suitable for transmitting shear forces, substantially replaces that material which was removed from the toothed belt to form the opening. The opening thus no longer constitutes a weak point in the tooth. This means that large forces can still be transmitted. In this connection, it is also possible to provide one and the same tooth with a plurality of fastening points.

Furthermore, the fit of the opening and retaining element can be so selected that the retaining element can be pushed into the opening and is frictionally secured therein against falling out, even if it is not held in place by the clamping of an object mounting.

The possibility is thus offered of equipping the toothed belt with a plurality of fastening points so that the user may use the toothed belt in very many ways. There is thus the possibility of experimentally determining the optimal arrangement of the object mountings both transverse to the toothed belt and in its longitudinal direction. Improvisations are also possible without difficulty. In this connection, it is apparently of no importance what type of object mountings are used in the specific application. The toothed belt is thus universally usable.

If the retaining elements comprise plastics material, they are preferably produced by injection moulding. This is not only simple and economical but also permits a high degree of variability in their shape.

If the user wishes to provide only a proportion of the fastening points which are provided on the toothed belt with retaining elements, blind elements can be pushed or glued into the unused openings. The strength of the teeth is maintained under these circumstances.

Furthermore, the retaining elements and also the blind elements are interchangeable and may be replaced by elements of a different type. Breakage of the elements does not result in destruction of the toothed belt. The object mountings are also interchangeable in a variable manner and may be replaced when worn.

The invention will be described below in more detail by way of preferred embodiments with reference to the accompanying drawings.

DESCRIPTION OF THE PREFERRED EMBODIMENTS

Figure 1:
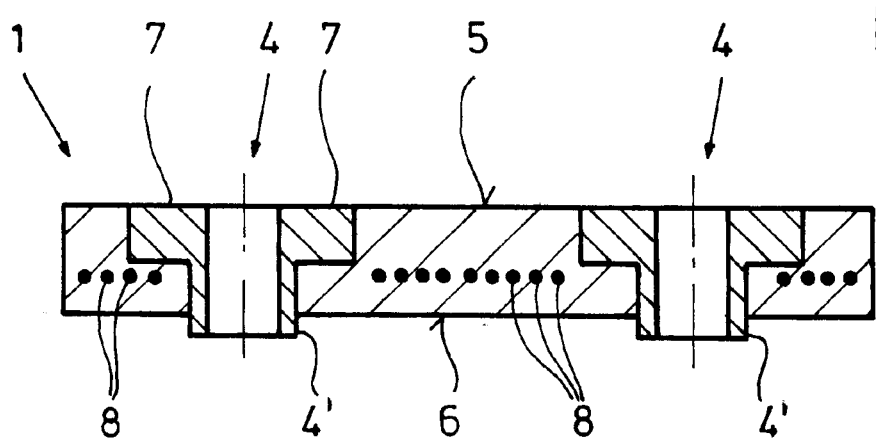
FIG. 1 is a sectional view through a toothed belt transverse to its direction of movement at the level of the tooth.
Figure 2:
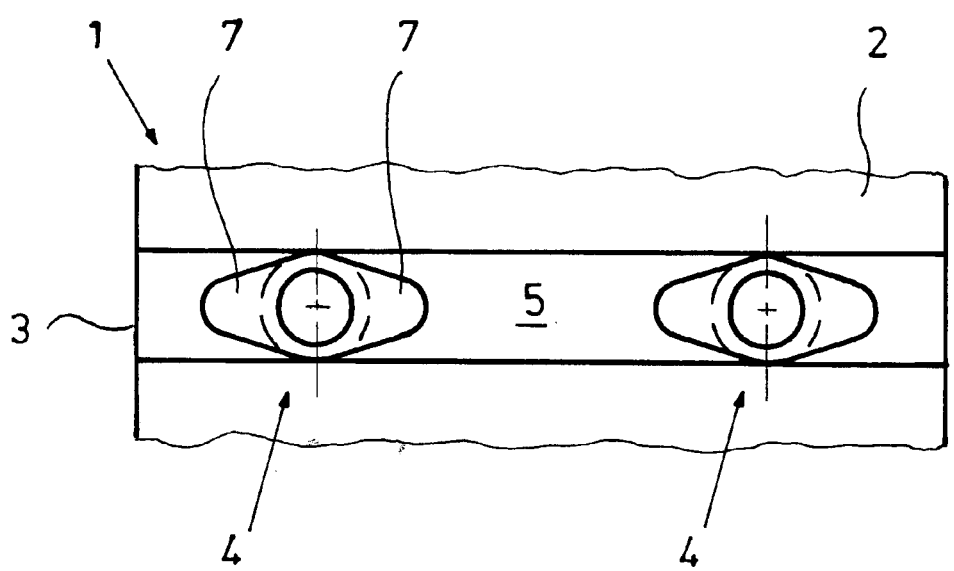
FIG. 2 is a plan view associated with FIG. 1.

As shown in FIGS. 1 and 2, a toothed belt 1 provided for transporting objects has a belt body 2, which is provided on one side with integrally formed teeth, see the tooth 3 in FIG. 2.

Inserted into the tooth 3 are two sleeve-shaped retaining elements 4 such that they are flush with the top surface 5 of the tooth and their elongate body 4' projects a short distance out of the surface 6 of the belt body on the other side of the belt body 2. The retaining elements 4 serve to secure object mountings, which are not shown.

The latter are clamped against the surface 6 of the belt body 2, and preferably also against the retaining elements 4, by screws which are screwed into the retaining elements 4. The retaining elements consist of plastics material so that the screw thread is pressed into their interior.

The retaining elements 4 make a sufficiently large screw-in length available so that the object mountings are safely and reliably secured. The openings for the retaining elements are produced in the manufacture of the toothed belt 2 and thus define very precisely positioned fastening points. The ends of the elongate bodies 4' projecting out of the surface 6 also act as centering projections which ensure very precise positioning of the object mountings.

If the object mountings are secured to the toothed belt by adhesive, the centering projections serve as joint supports, whereby the long holding periods which would otherwise be necessary are avoided. Welding beads on the outer edges of the object mountings can also be eliminated. The centering projections make the transfer of high gravitational forces possible. By virtue of a defined clamping of the object mountings against the centering projections, the height of the object mountings can be very precisely adjusted. The clamping force acting on the toothed belt may also be precisely regulated. Squashing of the toothed belt can thus not occur.

The object mountings can be of any desired construction as prescribed by the prevailing requirements at the position of use. The lateral spacing between the retaining elements 4 and their number per tooth also depends thereon. The same applies to the distribution of the retaining elements over the length of the toothed belt.

The toothed belt 1 conceptually enables very precise movement control. As a result of the construction and arrangement of the retaining elements 4, very precise positioning of the objects to be transported on the toothed belt 1 is ensured. The latter is thus available everywhere where objects, for instance workpieces, are to be transported very precisely from a loading station to a removal station.

The retaining elements 4 are provided with a respective head, which is constituted by two laterally projecting wings 7. The wings 7 ensure that when the object mountings are clamped against the surface 6 of the belt body 2 the retaining elements are not pulled through the associated openings. The wings 7 also constitute a reliable rotary lock for the retaining elements 4.

The retaining elements 4, including their wings 7, are fitted practically with no clearance into the associated openings in the toothed belt 1. They thus compensate for the weakness of the tooth 3 which would result from the openings, if these were not occupied by the retaining elements 4. The latter are able to transmit shear forces so that the load-bearing ability of the toothed belt 1 is not reduced by the fastening of the object mountings.

As shown in FIGS. 1 and 2, the retaining elements 4 are situated within the tooth profile and thus do not come into contact with the associated toothed pulleys. The outer periphery of the elongate bodies of the retaining elements 4, which corresponds in its upper region to the breadth of the top between the two wings 7, has approximately the breadth of the top surface 5 of the tooth 3. In distinction to this, it can be advantageous somewhat to enlarge the outer diameter of the elongate body and to select it so that the top region of the retaining elements follow the contour of the top of the tooth so that its flanks define partially elliptical recesses in the vicinity of the top of the tooth.

The retaining elements 4 comprise glass fibre-reinforced polyamide. Other materials are also possible if they have the necessary strength and—as is frequently of considerable significance—advantageously also the required temperature resistance.

The toothed belt 1 comprises polyurethane and is reinforced by longitudinally extending wire cables 8. As indicated in FIG. 1, the wire cables 8 can also extend in the regions of the wings 7 of the retaining elements 4 and thus reinforce their support in the material of the toothed belt.

Figure 3:
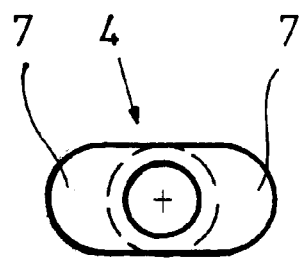
FIG. 3 is a plan view of a modified embodiment of a retaining element.

The retaining element 4 shown in FIG. 3 differs from that shown in FIGS. 1 and 2 merely in that the wings 7 are approximately rectangular. The corners are rounded, as are the tips of the wings in FIGS. 1 and 2.

Figure 4:
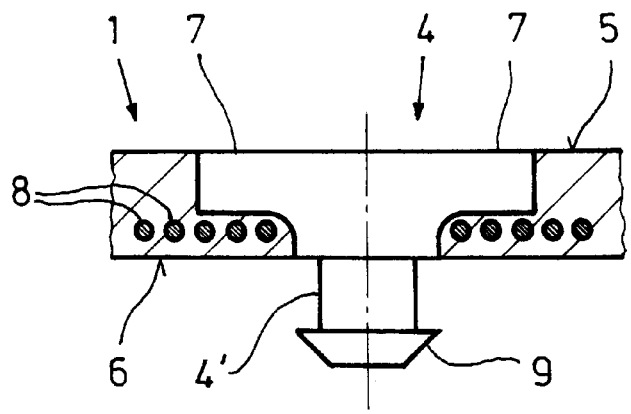
FIG. 4 is a sectional view of a further modified embodiment of a retaining element.

In the embodiment of FIG. 4, the elongate body 4' of the retaining element 4 has a mushroom-shaped head 9 for clipping into a complementary recess in the associated object mounting.

Figure 5:
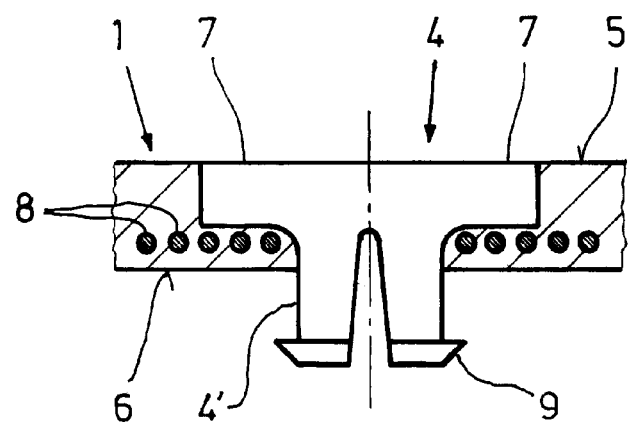
FIG. 5 is a sectional view of a further modified embodiment of a retaining element.

The retaining element 4 in FIG. 5 differs from that in FIG. 4 in that the elongate body 4' is divided in the manner of a fork and is thus elastically compressible.

Figure 6:
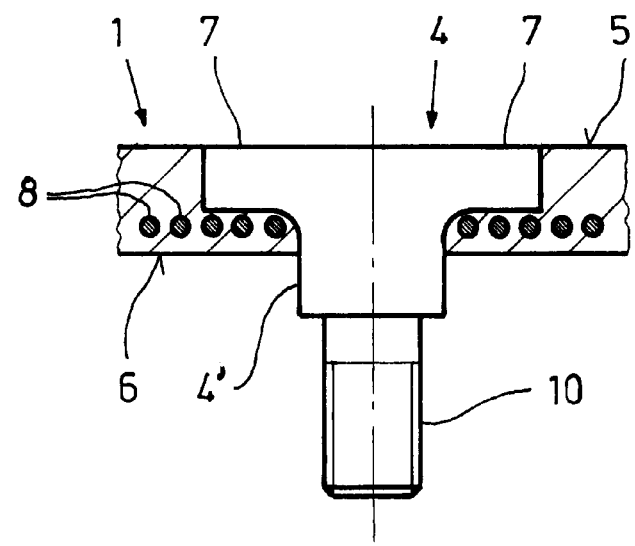
FIG. 6 is a sectional view of a further modified embodiment of a retaining element.

Finally, the retaining element 4 of FIG. 6 carries a threaded peg 10 onto which a nut may be screwed. The associated object mounting is clamped against a shoulder at the foot of the threaded peg 10 and against the toothed belt.

The elongate bodies 4' of the retaining elements 4 have a centering effect on the associated object mountings in the embodiments of FIGS. 4 to 6 also.

Modifications are of course possible within the scope of the invention.

Above all, it can be sufficient to permit the retaining elements 4 to project only a little into the belt body 2 if the screw-in length thereby made available by the sleeves is sufficient for reliably securing the object mountings. Blind elements, in particular, will be so dimensioned as regards their length that they terminate at most with the surface 6 of the belt body 2. The blind elements serve to close those openings in the teeth of the toothed belt which are provided for a variable construction of the usage region of the toothed belt but which are momentarily not in use. The blind elements ensure that no weakness occurs in the associated teeth. Instead of sleeve-shaped blind elements, correspondingly shaped pins with heads can be inserted. The sizing of the sleeves or pegs and of the associated openings in the toothed belt is such that a sufficiently self-supporting frictional lock is produced. The sleeve-shaped retaining elements shown in FIGS. 1 to 3 can be readily combined with the locking means shown in FIGS. 4 and 5.

What is claimed is:

1. Toothed belt for transporting objects, wherein
   the toothed belt has a band-shaped belt body with a first and a second side and carries integrally formed teeth on the first side of the belt body which have a crown surface,
   at least one of the teeth is provided with at least one opening which extends from the crown surface of the associated tooth through the toothed belt to the second side of the belt body and has a broadened region, which is formed in the crown surface of the associated tooth,
   a retaining element is arranged in the opening for an object mounting to be fastened on the second side of the belt body,
   the retaining element has an elongate body which extends through the tooth at least into the belt body,
   the elongate body has a head in the form of at least one laterally projecting wing and
   the wing engages in the broadened region of the opening.

2. Toothed belt as claimed in claim 1, wherein the retaining element is constructed in the form of a sleeve.

3. Toothed belt as claimed in claim 2, wherein the sleeve is provided with an internal screwthread.

4. Toothed belt as claimed in claim 3, wherein the sleeve is provided with the internal screwthread over its entire length.

5. Toothed belt as claimed in claim 1, wherein the retaining element consists of plastic material.

6. Toothed belt as claimed in claim 5, wherein the retaining element consists of glass fibre-reinforced polyamide.

7. Toothed belt as claimed in claim 1, wherein the elongate body of the retaining element engages through the belt body and projects out of its second side.

8. Toothed belt as claimed in claim 7, wherein the elongate body of the retaining element has an end projecting out of the second side of the toothed belt and is provided on this end with fastening or locking means.

9. Toothed belt as claimed in claim 1, wherein the wing is of substantially triangular shape.

10. Toothed belt as claimed in claim 1, wherein the head of the retaining element is constituted by two projecting wings which are diametrically opposed to one another.

11. Toothed belt as claimed in claim 10, wherein both wings are of substantially triangular shape.

12. Toothed belt as claimed in claim 1, wherein the belt body includes longitudinally extending reinforcing cables which also extend below the wing.

13. Toothed belt as claimed in claim 10, wherein the belt body includes longitudinally extending reinforcing cables which also extend below both wings.

14. Toothed belt as claimed in claim 1, wherein the head of the retaining element is fitted into the broadened region of the opening.

15. Toothed belt as claimed in claim 1, wherein at least a portion of the wing of the retaining element is disposed below the crown surface of the associated tooth.

16. Toothed belt as claimed in claim 1, wherein the wing of the retaining element is disposed in the broadened region of the opening such that the top surface of the retaining element is flush with the top surface of the associated tooth.

* * * * *